US008014793B2

(12) United States Patent
Kansal et al.

(10) Patent No.: US 8,014,793 B2
(45) Date of Patent: Sep. 6, 2011

(54) USE OF PREVIOUSLY-CALCULATED POSITION FIX FOR LOCATION BASED QUERY

(75) Inventors: Sachin Kansal, Sunnyvale, CA (US); Janell Paulson, Carlsbad, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1172 days.

(21) Appl. No.: 11/704,166

(22) Filed: Feb. 8, 2007

(65) Prior Publication Data
US 2008/0194273 A1 Aug. 14, 2008

(51) Int. Cl.
*H04W 24/00* (2009.01)
(52) U.S. Cl. ............... 455/456.3; 455/456.2; 455/457
(58) Field of Classification Search ............ 455/456.1, 455/456.2, 456.3, 456.4, 456.5, 456.6
See application file for complete search history.

(56) References Cited

U.S. PATENT DOCUMENTS

| 5,365,450 | A | 11/1994 | Schuchman et al. |
| 5,422,813 | A | 6/1995 | Schuchman et al. |
| 5,726,893 | A | 3/1998 | Schuchman et al. |
| 6,347,227 | B1 * | 2/2002 | Johansson ............... 455/456.1 |
| 6,628,938 | B1 | 9/2003 | Rachabathuni et al. |
| 6,757,545 | B2 * | 6/2004 | Nowak et al. ............. 455/456.2 |
| 6,937,865 | B1 | 8/2005 | Bloebaum et al. |
| 7,254,404 | B2 * | 8/2007 | van Diggelen et al. .... 455/456.1 |
| 7,379,729 | B2 * | 5/2008 | Holland et al. ........... 455/404.2 |
| 2002/0068997 | A1 | 6/2002 | Agashe et al. |
| 2002/0102992 | A1 * | 8/2002 | Koorapaty et al. ........... 455/456 |
| 2002/0142783 | A1 | 10/2002 | Yoldi et al. |
| 2002/0164996 | A1 * | 11/2002 | Dorenbosch ............... 455/456 |
| 2003/0225515 | A1 | 12/2003 | Havlark et al. |
| 2004/0198449 | A1 | 10/2004 | Forrester et al. |
| 2004/0259572 | A1 * | 12/2004 | Aoki et al. ............... 455/456.2 |
| 2005/0107097 | A1 * | 5/2005 | Bahl et al. ............... 455/456.6 |
| 2005/0228589 | A1 * | 10/2005 | Diggelen et al. .............. 702/1 |
| 2006/0181452 | A1 | 8/2006 | King et al. |
| 2006/0240848 | A1 | 10/2006 | McMahan |
| 2006/0293066 | A1 * | 12/2006 | Edge et al. ............... 455/456.3 |
| 2008/0026722 | A1 * | 1/2008 | Dunn et al. ............... 455/404.1 |

FOREIGN PATENT DOCUMENTS
EP 1329693 7/2003

OTHER PUBLICATIONS

U.S. Appl. No. 11/634,350, filed Dec. 5, 2006, Paulson et al.
U.S. Appl. No. 11/469,374, filed Aug. 31, 2006, Zhao et al.
U.S. Appl. No. 11/729,966, filed Mar. 29, 2007, Paulson et al.
Jim Deloach, Location Based Application Hands-on Considerations, printed at website http://72.14.203.104/search?q=cache:2mW9NPjxWOQJ:brew.qualcomm.com/brew_bnry/pdf/events/brew_2006/prog801_delo . . . , on Nov. 28, 2006, 33 pages (Note: readable version attached also).
Website printed at http://www.datagrid-international.com/Mk2.htm, on Nov. 28, 2006, 4 pages.
Archive for the 'Assisted CPS' Category, printed at website http://www.jeepx.net/?cat=4, on Nov. 28, 2006, 15 pages.
QUALCOMM, gpsOne® Position-Location Technology, 4 pages.

(Continued)

Primary Examiner — Christopher M Brandt

(57) ABSTRACT

A computing device is provided for responding to a location-based query. The computing device receives the query, determines that a current position fix is unavailable, retrieves from memory a previously-calculated position fix calculated before receipt of the location-based query, and provides a response to the query based on the previously-calculated position fix.

18 Claims, 4 Drawing Sheets

OTHER PUBLICATIONS

Make Location Aware Apps Part of the Grind with BREW, printed at website http://www.devx.com/wireless/Article/29563/1954?pf=true, on Nov. 28, 2006, 5 pages.

How I Use My GPS, printed at website http://notions.okuda.ca/geotagging/how-i-use-my-gps/, on Dec. 27, 2006, 5 pages.

Garmin StreetPilot, printed at website http://www.amazon.com/Gramin-StreetPilot-Portable-Navigation-Traffic/dp/B000A5T7AO, on Dec. 27, 2006, 15 pages.

International Search Report and Written Opinion for International Application No. PCT/US 2007/082326, mail date Apr. 28, 2008, 10 pages.

* cited by examiner

USE OF PREVIOUSLY-CALCULATED POSITION FIX FOR LOCATION BASED QUERY

BACKGROUND

Some mobile computing devices provide location-based services to a user. For example, a user may use a mobile computing device to search for nearby points of interest (POIs). Further, the mobile computing device may use a navigation application to provide directions from the user's current location to a desired destination.

Some location determination methods require the use of real-time wireless data from a wireless network. An alternative method uses an on-board global positioning system receiver to acquire satellite data and provide a standalone position fix. However, there are scenarios where satellite data is not available, such as in a parking garage or office building, and there are scenarios where wireless service is not available, such as when the mobile device is deep in a canyon, on a cruise ship, in a foreign country, or when there is a network failure due to a temporary block or other cause, etc. The ability to process a location-based query may nevertheless be useful in these scenarios.

Accordingly, there is a need for a system and method for providing position fixes when wireless and/or satellite positioning data is unavailable. Further, there is a need for a system and method for providing a configurable location determination scheme which selectively allows the use of previously-calculated position fixes to respond to a location-based query. Further still, there is a need for a system and method for determining whether a previously-calculated position fix is suitable for use in responding to a location-based query.

The teachings herein extend to those embodiments which fall within the scope of the appended claims, regardless of whether they accomplish one or more of the above-mentioned needs.

DETAILED DESCRIPTION OF THE EXEMPLARY EMBODIMENTS

The disclosures of U.S. patent application Ser. No. 11/469, 374 filed Aug. 31, 2006 and U.S. patent application Ser. No. 11/634,350 filed Dec. 5, 2006 are incorporated by reference herein in their entirety.

Figure 1:
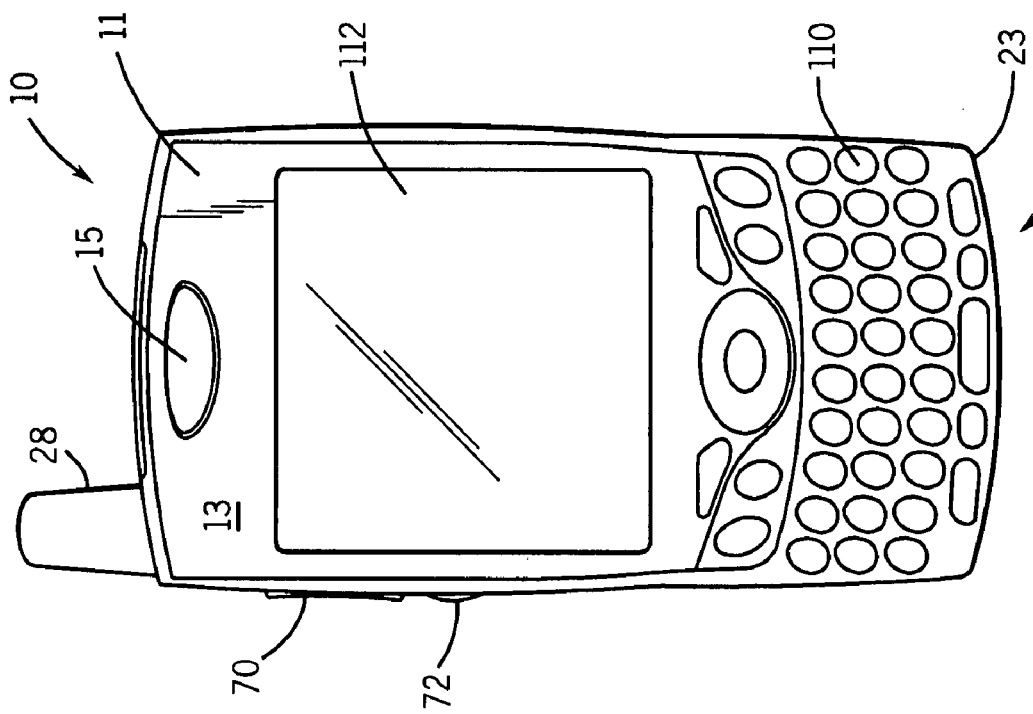
FIG. 1 is a front view of a mobile computing device, according to an exemplary embodiment.

Referring first to FIG. 1, a mobile computing device 100 is shown. Device 100 is a smartphone, which is a combination mobile telephone and handheld computer having personal digital assistant functionality. A handheld computer is a device of suitable size to fit in one's pocket. The teachings herein can be applied to other mobile computing devices (e.g., a laptop computer, a personal navigation device, etc.) or other electronic devices (e.g., a desktop personal computer, etc.). Personal digital assistant functionality can comprise one or more of personal information management, database functions, word processing, spreadsheets, voice memo recording, etc. and is configured to synchronize personal information from one or more applications with a computer (e.g., desktop, laptop, server, etc.). Device 100 is further configured to receive and operate additional applications provided to device 100 after manufacture, e.g., via wired or wireless download, SecureDigital card, etc.

Figure 2:
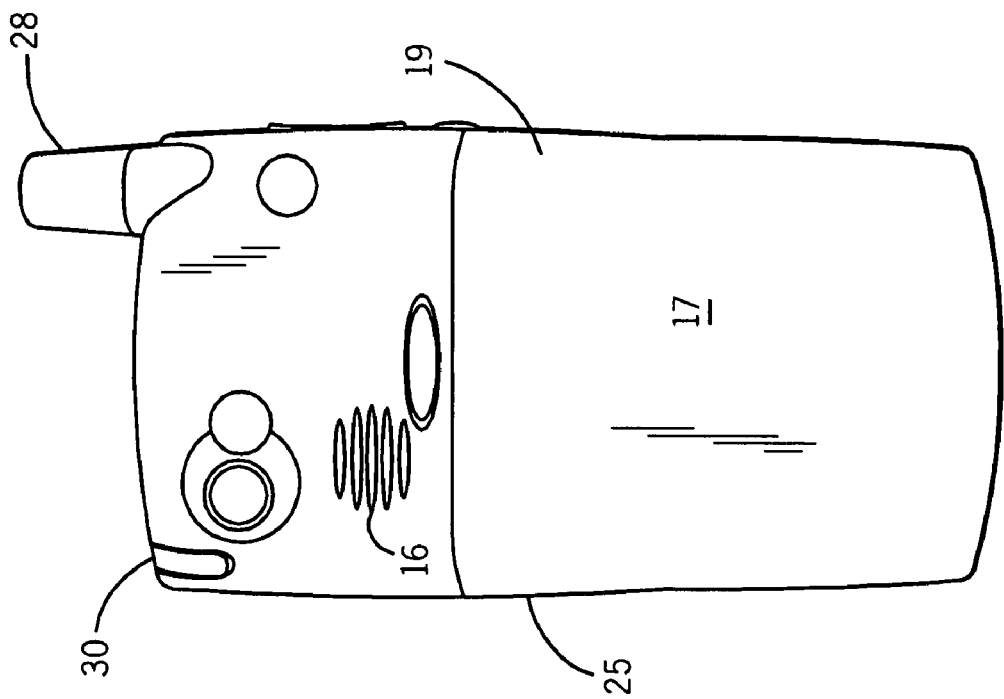
FIG. 2 is a back view of a mobile computing device, according to an exemplary embodiment.

Device 100 comprises a housing 11 having a front side 13 and a back side 17 (FIG. 2). An earpiece speaker 15 may be an electro-acoustic transducer configured to provide audio output with a volume suitable for a user placing earpiece 15 against or near the ear. Loudspeaker 16 may be an electro-acoustic transducer that converts electrical signals into sounds loud enough to be heard at a distance. In alternative embodiments, display 112, user input device 110, earpiece 15 and loudspeaker 16 may each be positioned anywhere on front side 13, back side 17 or the edges therebetween.

Device 100 may provide voice communications functionality in accordance with one or more cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, device 100 may be configured to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, etc.

Device 100 may be configured to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

Device 100 may be configured to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth.

Figure 3:
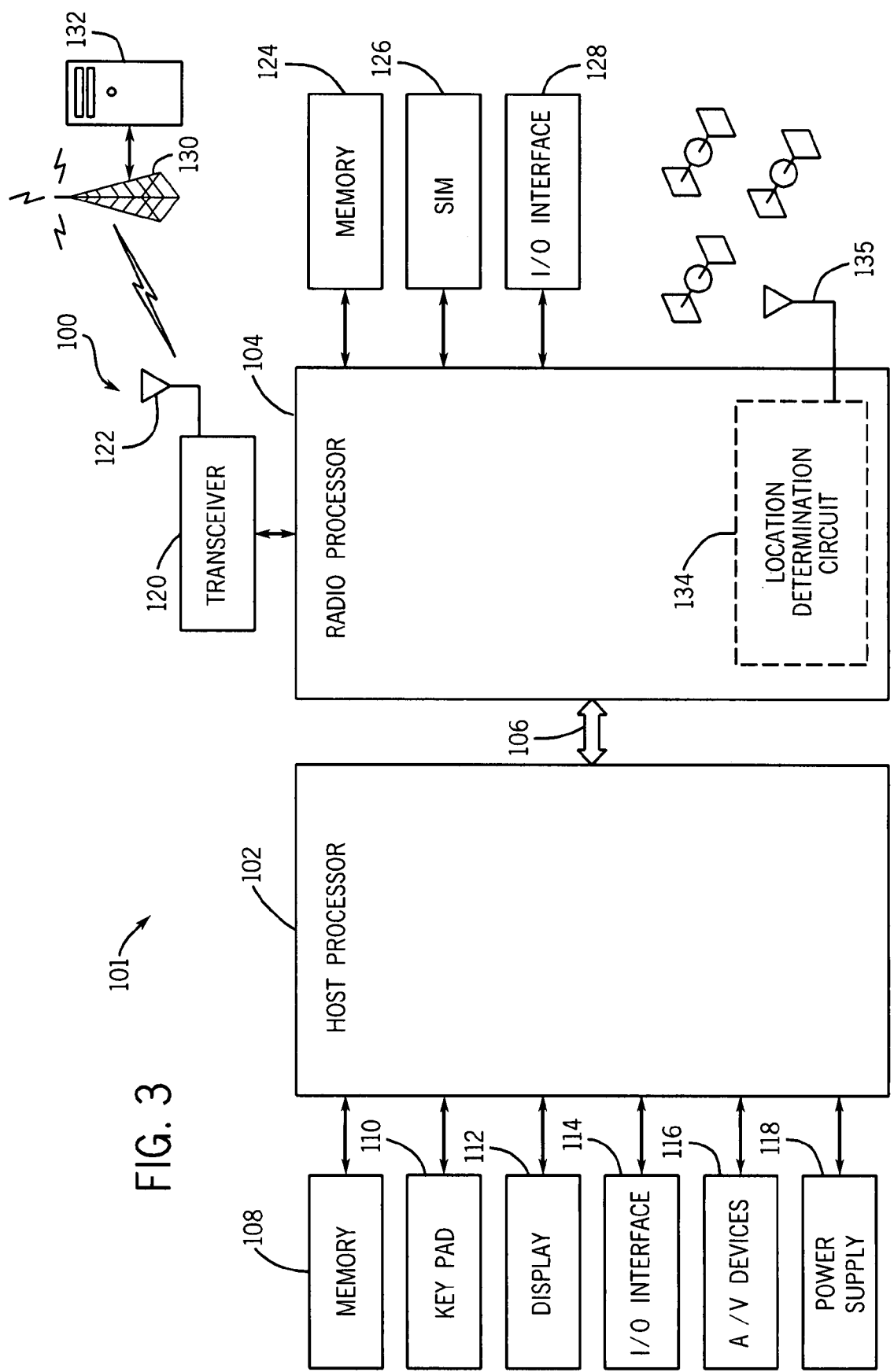
FIG. 3 is a block diagram of the mobile computing device of FIGS. 1 and 2, according to an exemplary embodiment.

As shown in the embodiment of FIG. 3, device 100 may comprise a processing circuit 101, such as a dual processor architecture including a host processor 102 and a radio processor 104 (e.g., a base band processor). The host processor 102 and the radio processor 104 may be configured to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth.

The host processor 102 may be responsible for executing various software programs such as application programs and system programs to provide computing and processing operations for device 100 and the routines or processes described below with reference to FIGS. 4 and 5. The radio processor 104 may be responsible for performing various voice and data communications operations for device 100 such as transmitting and receiving voice and data information over one or more wireless communications channels. Although embodiments of the dual processor architecture may be described as comprising the host processor 102 and the radio processor 104 for purposes of illustration, the dual processor architecture of device 100 may comprise additional processors, may be implemented as a dual- or multi-core chip with both host processor 102 and radio processor 104 on a single chip, etc. Also, device 100 may use a single processor architecture, such as in an embodiment without wireless data and/or voice communication capability, or in a dedicated personal navigation device application.

Device 100 may comprise a memory 108 coupled to the host processor 102. In various embodiments, the memory 108 may be configured to store one or more software programs to be executed by the host processor 102. The memory 108 may be implemented using any machine-readable or computer-readable media capable of storing data such as volatile memory or non-volatile memory, removable or non-removable memory, erasable or non-erasable memory, writeable or re-writeable memory, and so forth. Although the memory 108 may be shown as being separate from the host processor 102 for purposes of illustration, in various embodiments some portion or the entire memory 108 may be included on the same integrated circuit as the host processor 102. In various embodiments, device 100 may comprise an expansion slot to support a multimedia and/or memory card, for example.

Device 100 may comprise a user input device 110 coupled to the host processor 102. The user input device 110 may comprise, for example, a QWERTY key layout and an integrated number dial pad. Device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad, an alphanumeric keypad, and so forth.

Host processor 102 may be coupled to display 112. Display 112 may comprise any suitable visual interface for displaying content to a user of device 100. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

Device 100 may comprise an input/output (I/O) interface 114 coupled to the host processor 102. The I/O interface 114 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, device 100 may be configured to transfer and/or synchronize information with the local computer system.

The host processor 102 may be coupled to a power supply 118 configured to supply and manage power to the elements of device 100. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

Device 100 may comprise a transceiver module 120 coupled to the radio processor 104. The transceiver module 120 may comprise one or more transceivers configured to communicate using different types of protocols, communication ranges, operating power requirements, RF sub-bands, information types (e.g., voice or data), use scenarios, applications, and so forth. Device 100 may comprise an antenna system 122 for transmitting and/or receiving electrical signals. As shown, the antenna system 122 may be coupled to the radio processor 104 through the transceiver module 120. The antenna system 122 may comprise or be implemented as one or more internal antennas and/or external antennas.

Device 100 may comprise a subscriber identity module (SIM) 126 coupled to the radio processor 104. The SIM 126 may comprise, for example, a removable or non-removable smart card configured to encrypt voice and data transmissions and to store user-specific data for allowing a voice or data communications network to identify and authenticate the user. The SIM 126 also may store data such as personal settings specific to the user.

In various embodiments, device 100 may comprise location determination capabilities. Device 100 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

Device 100 may be configured to operate in one or more location determination modes including, for example, a standalone mode, a mobile station (MS) assisted mode, and/or an MS-based mode. In a standalone mode, such as a standalone GPS mode, device 100 may be configured to determine its position (e.g. calculate a position fix, generate location data, etc.) without receiving real-time or continuous wireless navigation data from the network. In the standalone mode, device 100 may comprise a local location determination circuit 134 (e.g., a GPS receiver) which may be integrated within housing 11 (FIG. 1) configured to receive satellite data via an antenna 135 and to calculate a position fix. Local location determination circuit may alternatively comprise a GPS receiver in a second housing separate from housing 11 but in the vicinity of device 100 and configured to communicate with device 100 wirelessly (e.g., via a PAN, such as Bluetooth). When operating in an MS-assisted mode or an MS-based mode, however, device 100 may be configured to communicate over a radio access network 130 (e.g., UMTS radio access network) with a remote computer 132 (e.g., a position determination entity (PDE), a location proxy server (LPS) and/or a mobile positioning center (MPC), etc.). Location determination circuit 134 may alternatively be a hardware and/or software portion of processing circuit 101 configured to provide location data or position fixes to other applications running on processing circuit 101, regardless of whether the calculation of the location data fix occurs using standalone, MS-assist, MS-based or other location-determination techniques.

In an MS-assisted mode, such as an MS-assisted AGPS mode, the remote computer 132 may be configured to determine the position of the mobile computing device and provide wireless data comprising a position fix. In an MS-based mode, such as an MS-based AGPS mode, device 100 may be configured to determine its position using acquisition data or other wireless data from the remote computer 132. The acquisition data may be provided periodically. In various implementations, device 100 and remote computer 132 may be configured to communicate according to a suitable MS-PDE protocol (e.g., MS-LPS or MS-MPC protocol) such as the TIA/EIA standard IS-801 message protocol for MS-assisted and MS-based sessions in a CDMA radiotelephone system.

When assisting mobile computing device 100, remote computer 132 may handle various processing operations and also may provide information to aid location determination. Examples of assisting information may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, and so forth.

In various embodiments, device 100 may comprise dedicated hardware circuits or structures, or a combination of dedicated hardware and associated software, to support location determination. For example, the transceiver module 120 and the antenna system 122 may comprise GPS receiver or transceiver hardware and one or more associated antennas coupled to the radio processor 104 to support location determination.

The host processor 102 may comprise and/or implement at least one LBS (location-based service) application. In general, the LBS application may comprise any type of client application executed by the host processor 102, such as a GPS application, configured to communicate location queries and location responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

The LBS application may be configured to send a location request in response to receiving input from device 100 or from a source external to device 100. For example, the user of device 100 may interact with a data input device to command the LBS application to send a location-based query. The LBS application also may send a location-based query in response to receiving input from an external network element or computing device that is attempting to locate the user of device 100. In some cases, the LBS application also may be configured to automatically, periodically, and/or autonomously send location-based queries.

Although other applications may operate without regard to the location of device 100, in various embodiments, the LBS application may request and receive position information to enhance the functionality of one or more of the other applications. For example, position information may be provided in conjunction with a messaging application to locate the sender or recipient of a message. Position information may be provided to a web browser application to generate directions to a location associated with a particular website. Positioning information may be provided to a personal management application to generate location-based alerts and/or directions to a meeting place.

Radio processor 104 may be configured to invoke a position fix by configuring a position engine and requesting a position fix. For example, a position engine interface on radio processor 104 may set configuration parameters that control the location determination process. Examples of configuration parameters may include, without limitation, location determination mode (e.g., standalone, MS-assisted, MS-based), actual or estimated number of position fixes (e.g., single position fix, series of position fixes, request assisting information without a position fix), time interval between position fixes, Quality of Service (QoS) values, optimization parameters (e.g., optimized for speed, accuracy, or payload), PDE address (e.g., IP address and port number of LPS or MPC), etc.

Radio processor 104 also may set request/response parameters to request and return various types of position information. Examples of request/response parameters may include current location, latitude, longitude, altitude, heading, vector information such as horizontal and vertical velocity, sector-based position location, position fix method, level of accuracy, time offset, position uncertainty, device orientation, client initialization and registration, and so forth.

Figure 4:
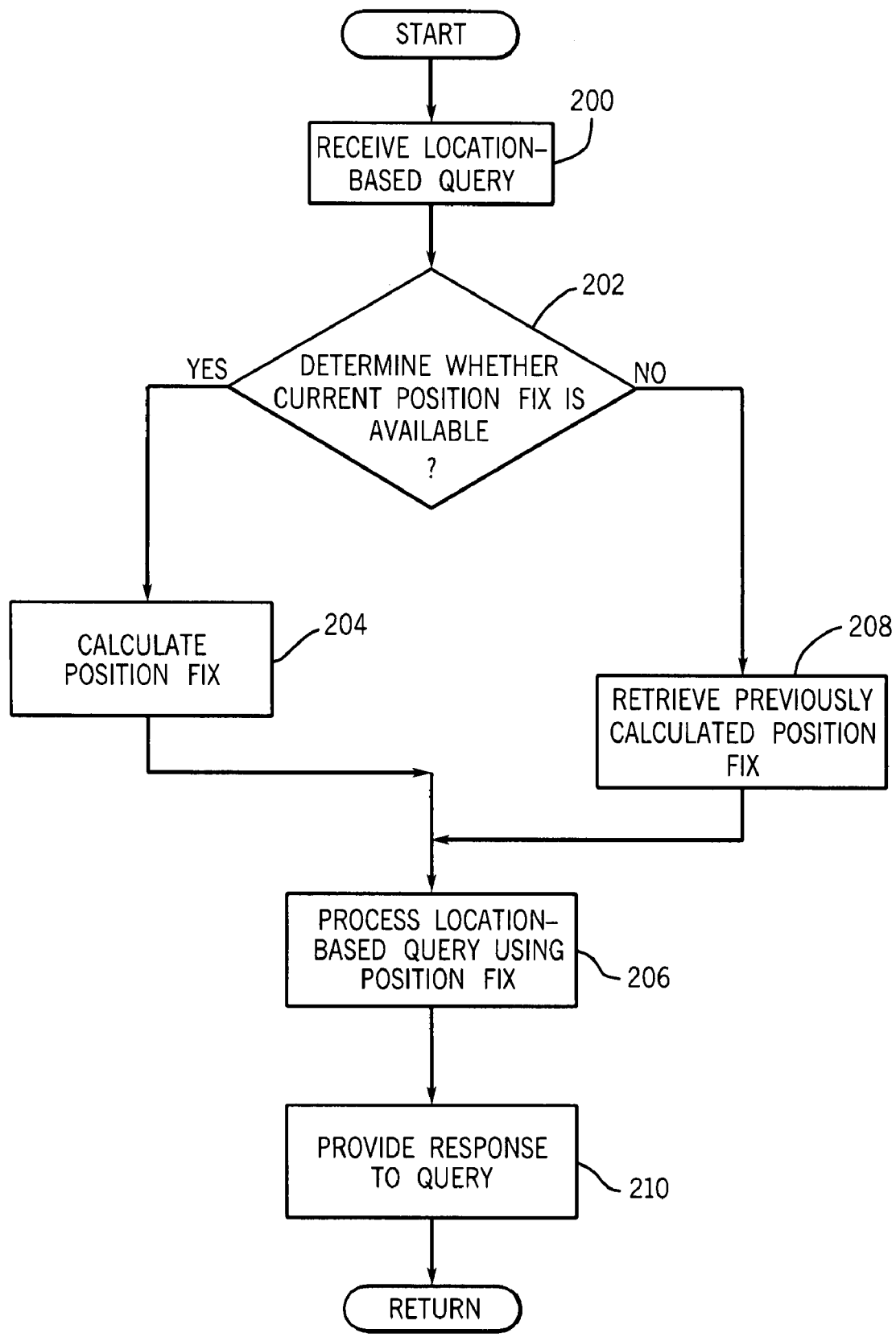
FIG. 4 is a flowchart illustrating a system and method for processing a location-based query, according to an exemplary embodiment.

Referring now to FIG. 4, a system and method for responding to a location-based query will be described according to an exemplary embodiment. At step 200, processing circuit 101 is configured to receive a location-based query. The query may come from a user via a user interface or from an application running on processing circuit 101, or from a remote source. The query may be for any type of location-based service, such as a request for a nearby point of interest (e.g., nearby POIs associated with the key word "pizza" or "gas"), a request to find a nearby family member or friend having a mobile computing device, a request for directions to a destination, etc.

At step 202, processing circuit 101 is configured to determine whether a current position fix is available. For example, processing circuit 101 is configured to determine whether sufficient satellite data is available for location determination circuit 134 and/or radio processor 104 to calculate or provide a position fix (e.g., satellite data signals may be blocked, thereby making the satellite data unavailable and/or insufficient, in an office building, parking garage, or in an urban canyon). As another example, processing circuit 101 may be configured to determine whether current position fixes using wireless network resources are available. Error types from the wireless network or PDE 132 may include, but not be limited to: "wireless service unavailable," "device roaming," "data authentication failure," "PDE authentication failure," "data service unavailable," "wireless network failure," "base station (BS) does not support service," "BS does support service, but it is temporarily unavailable," etc. As another example, processing circuit 101 may be configured to determine whether a current position fix is available based on a position fix calculation characteristic provided by the requesting entity (e.g., where the requesting entity specifies standalone, MS-Based, MS-Assist, a predetermined calculation speed, a calculation accuracy, and/or a data source, etc.) and the configuration of device 100 (e.g., whether to allow standalone position fixes when wireless data is unavailable, etc.), such as is described in U.S. patent application Ser. No. 11/634,350, filed Dec. 5, 2006. As another example, a user may have manually turned off location determination circuit 134, thereby making current position fixes unavailable.

At step 202, the determination of whether a current position fix is available may result in processing circuit 101 setting a flag or other indicator in memory indicating current position fixes are unavailable.

At step 204, if a current position fix is available, a current position fix is calculated, and the location-based query is processed using the current position fix at step 206.

At step 208, if a current position fix is unavailable or insufficient data is present, processing circuit 101 is configured to retrieve a previously-calculated position fix. The previously-calculated position fix may be a position fix calculated by processing circuit 101 and/or PDE 132 prior to receiving the location-based query (step 200), prior to the determination of whether a current position fix is available (step 202), prior to another processing step, or at an earlier point in time. The previously-calculated position fix may have been stored in memory 124, and may have been stored for some period of time (e.g., minutes, hours, days, etc.) before being retrieved in step 208.

At step 206, the location-based query is processed using either the current position fix or previously-calculated position fix. For example, a search for nearby POIs may be conducted, using either an on-board or off-board map database (e.g., comprising road, intersection, POI and other data typically stored in a geographic information database). At step 210, a response is provided to the query. The response may comprise providing graphical or textual representations of nearby POIs to a display for a user to view, or may comprise providing response data to the application or remote source which sent the location-based query. The response may further provide an indication of whether a current position fix was available and/or whether a previously-calculated or "last known" position fix was used to process the location-based query.

Figure 5:
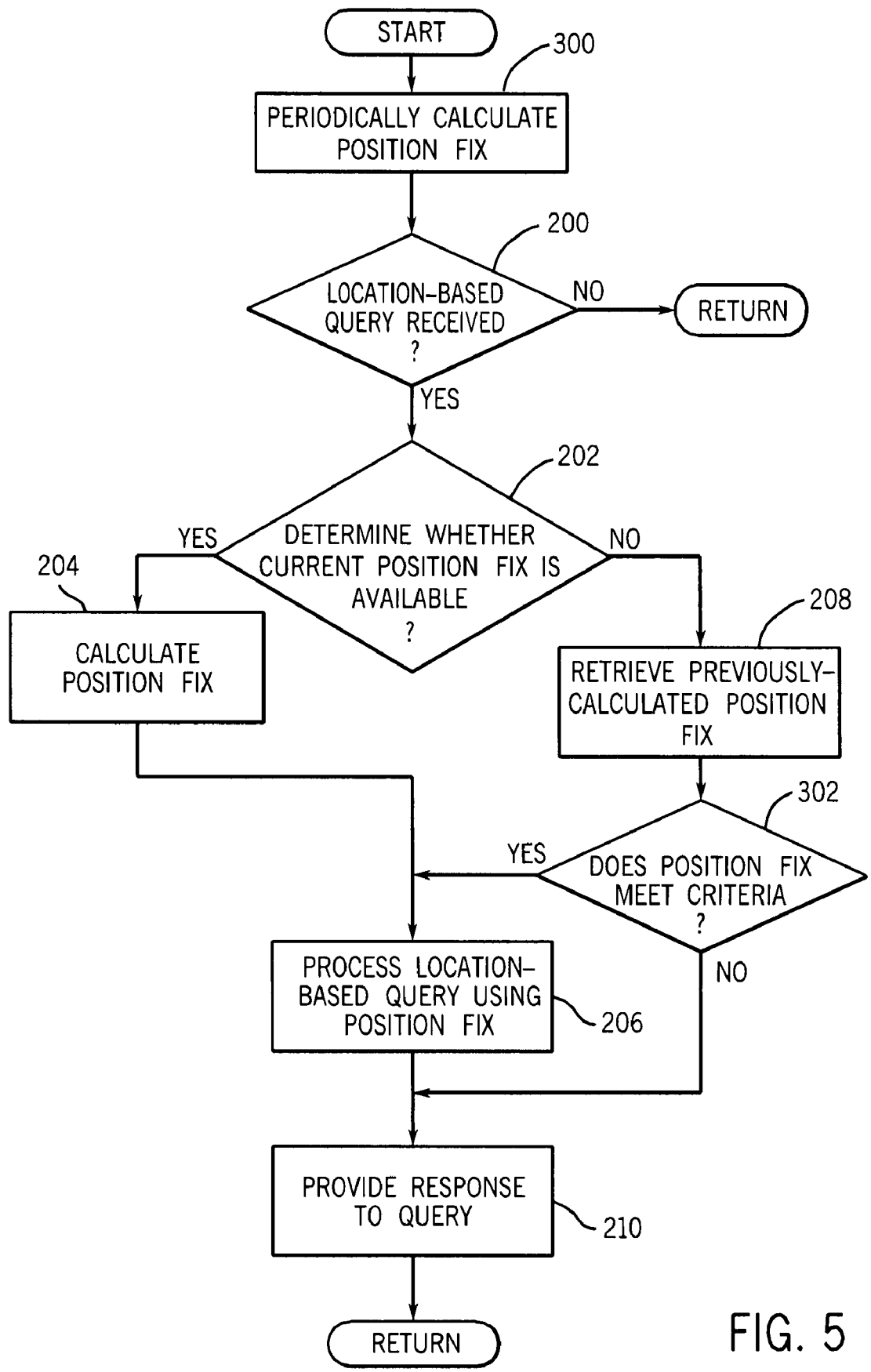
FIG. 5 is a flowchart illustrating a system and method for processing a location-based query, according to an alternative embodiment.

Referring to FIG. 5, a system and method for responding to a location-based query will be described according to another exemplary embodiment, wherein reference numerals common to FIG. 4 refer to the same or similar processes. In a step 300, processing circuit 101 is configured to periodically calculate position fixes regardless of whether a request for a position fix is received from an application or a user. The position fixes may be calculated with a period of greater than approximately 30 seconds and/or less than approximately 1 hour. The position fixes may preferably be calculated with any period between approximately 1 minute and 1 hour, such as every 20 minutes. Other periods are contemplated, and may be pre-set and/or dynamically adjustable based on battery life, desired performance of the operating system on processing circuit 101, or other factors. By periodically calculating position fixes whether or not requested by an application or user, the previously-calculated position fix or last known location data remains somewhat current. In this exemplary embodiment, step 300 occurs before step 200. At step 200, if no location-based query is received, processing returns to other functions, which may then result in a later periodic calculation of a position fix at step 300.

At a step 302, processing circuit 101 is configured to determine whether the previously-calculated position fix meets one or more of a plurality of criteria and (at step 206 and 210) to provide the response to the query based on whether the one or more criteria are met. If the previously-calculated position fix was calculated several days ago while device 100 was at a home location, and device 100 is now at a work location, using the previously-calculated position fix for a location-based query will yield results near the home location, not the work location. In this embodiment, the location-based query is processed based on whether the previously-calculated position fix meets one or more predetermined criteria. Criteria can include a predetermine time parameter since the previously-calculated position fix was calculated. The time parameter may be less than 4 hours, less than 1 hour, less than 15 minutes, or another time parameter. Criteria can include a speed parameter at which device 10 was traveling when the previously-calculated position fix was calculated. The speed parameter may be less than 10 miles per hour (e.g., to indicate the user of device 10 was walking, not driving a car) or less than 1 miles per hour (e.g., to indicate the user's position was static) and may likely still be in the vicinity of the previously-calculated position fix. Criteria can be met based on an estimate of a current position based on map data associated with the previously-calculated position. For example, if map data indicates that the last-known position fix occurred just before the user entered a tunnel, a building, or a parking garage, it will have an indication of whether the user is still in the vicinity of the last-known position fix. Criteria can be met based on what time zone the user is in right now; if the network time zone is different than the last known time zone stored on device 10, this means the user might have moved away from the previous location and hence the last known fix may be wrong. If, however, the location recently went through a daylight savings time change, that would be an exception. Criteria can be met based on whether the general location of the device is much different than before. Even if device 10 is not able to get a current position fix, device 10 can at least determine which wireless base station it is in communication with. If device 10 is still in communication with the same base station, then the last known position fix may still be relevant. But if it is not, then it may or may not be relevant. Combinations of two or more of these or other criteria can be used to provide greater accuracy in the determination of whether the previously-calculated position fix is suitable for use in processing the location-based query.

Criteria can be also be met based on location uncertainty (or certainty) data of the previously-calculated position fix and, in particular, whether the location uncertainty is above a predetermined threshold. Uncertainty data or numbers may be determined at the time the previously-calculated position fix is calculated and may be stored as part of a data structure containing the previously-calculated position fix. Criteria can also be met based on whether a predetermined number of satellites were used in determining the previously-calculated position fix, which would indicate a level of uncertainty. Criteria can also be met based on whether a position fix is needed which has an altitude fix and whether the previously-calculated position fix had an altitude component to it. Criteria can also be met based on whether the positioning source used to determine the previously-calculated position fix was appropriate for the subsequently-requested position fix. The positioning source may include advanced forward-link trilateration (AFLT), global positioning system (GPS), cell ID, or other positioning source, which may imply a level of uncertainty.

According to one embodiment, the one or more criteria may be used to calculate or derive a confidence factor based on predetermined consumer or experimental data stored in memory 124; if the confidence factor exceeds a predetermined confidence factor (which may be fixed or variable based on other characteristics), the previously-calculated position fix may be used in step 206.

In this embodiment, if the previously-calculated position fix meets the one or more criteria, at step 206 the location-based query is processed using the position fix. If not, the query is not processed and a response is provided at step 210, which response may comprise an indication that the previously-calculated position fix is unreliable because the criteria is/are not met. In an alternative embodiment, even if the one or more criteria are not met, the location-based query may still be processed. In this alternative, preferably a message is sent along with the response to the query to indicate that the response may be unreliable. For example, an indication can be provided that the previously-calculated position fix did not meet a reliability threshold or confidence factor. Further, an indication can be provided as to where the previously-calculated position fix was located (e.g., at a home location even though device 100 is now located at a work location), so that the user will know that the response to the location-based query found results based on the home location.

According to one exemplary scenario, a user of device 10 is receiving current position fixes on the way to work, using a smartphone with an on-board GPS receiver. Each current position fix is stored and replaces the last stored position fix as the last known position fix. When device 10 enters an office building, GPS signals sufficient for calculating current position fixes are no longer available to device 10 based on device 10's capabilities and/or settings and the surrounding structure of the office building. Approximately 15 minutes after entering the building, the user enters a POI request to device 10 using input keys and/or a touch screen interface to search for nearby POIs having "pizza" in their data files. Device 10 determines that current position fixes are unavailable and reads the last known position fix from memory along with an indication of how old the last known position fix is. Device 10 determines that because the last known position fix is less than 2 hours old (or some other threshold), that the last known position fix is sufficiently likely to still be accurate so as to pass the time parameter criteria. Device 10 searches an on-board or off-board database of POIs for POIs having "pizza" in their data files nearby (e.g., within 5 miles or other distance limitation) the last known position fix. Any results are displayed as a response on the display of device 10 for the user to see. Selecting one POI then launches a navigation function which directs the user to the POI from the last known position fix, by showing a map of directions and/or turn-by-turn navigation instructions.

According to one alternative embodiment, when a current position fix is unavailable, device 100 may provide a message or indication to the application or to the user that a previously-calculated position fix is available (and, optionally, whether it meets the one or more criteria) and the application or user may be given the option of confirming whether the previously-calculated position fix should be used. Device 100 may be configured to provide a list of characteristics of the previously-calculated position (e.g., how long ago or date and time position fix was calculated, speed at which device 100 was traveling during calculating, map data associated with previously-calculated position fix, etc.) to assist the application or user in deciding whether to confirm that the previously-calculated position fix should be used.

According to another alternative embodiment, processing circuit 101 may be configured to determine that the application requesting the position fix requires a currently generated position fix (e.g., such as may be the case with a turn-by-turn navigation application) and may make the determination that the previously-calculated position fix should not be used based on this characteristic of the query or entity making the query. Processing circuit 101 may be configured to provide a response to the query indicating that real-time or current position fixes are unavailable and that the previously-calculated position fix is not being provided based on the determination that the application requires currently-generated position fixes.

According to another alternative embodiment, the previously-calculated position fix may be updated based on data known while position fixes were available. For example, if device 10 was traveling at highway speeds down a stretch of road with no foreseeable exits or city areas of significant size, device 10 may be configured to infer or predict that device 10 stayed on that road at a similar speed after position fixes became unavailable. Device 10 may then update its previously-calculated position fix using the assumptions of continuous travel of a similar speed to provide a more accurate, up-to-date previously-calculated position fix. Other predictive algorithms may be implemented.

While the exemplary embodiments illustrated in the Figs., and described above are presently exemplary, it should be understood that these embodiments are offered by way of example only. For example, the above steps of the various embodiments may be interchanged with other embodiments and rearranged in their order of execution. Also, the previously-calculated position fix can be any one of a plurality of position fixes calculated when current position fixes were available, and need not be the last known position fix. Accordingly, the present invention is not limited to a particular embodiment, but extends to various modifications that nevertheless fall within the scope of the appended claims.

What is claimed is:

1. A method for responding to a location-based query, comprising:

receiving a location-based query for a point of interest;

determining that a mobile device is unable to obtain a current position fix;

retrieving from memory a previously-calculated position fix calculated before receipt of the location-based query;

determining whether the previously-calculated position fix meets a criteria;

processing the location-based query based upon the previously-calculated position fix; and providing a response to the query based on the previously-calculated position fix and whether the criteria is met, the response including displaying one or more points of interest and an indication that the previously-calculated position fix was used to process the location-based query, the displayed one or more points of interest are selectable to launch a navigation application configured to provide directions from the previously-calculated position fix to a selected point of interest;

wherein the criteria comprises at least one of:

a predetermined speed parameter at which the mobile computing device was traveling when the previously-calculated position fix was calculated;

whether the mobile computing device is in a different time zone from a time zone the mobile computing device was in when the previously-calculated position fix was calculated;

whether a general location of the mobile computing device is much different than the previously-calculated position fix; and whether a location uncertainty factor for the previously-calculated position fix is above a predetermined threshold.

2. The method of claim 1, wherein determining that the mobile device is unable to obtain a current position fix comprises determining that insufficient satellite data is available.

3. The method of claim 1, wherein the criteria comprises a predetermined time parameter since the previously-calculated position fix was calculated.

4. The method of claim 1, wherein the determination of whether the criteria is met is based on an estimate of a current position based on map data associated with the previously-calculated position.

5. The method of claim 1, wherein the response to the query comprises an indication that the previously-calculated position fix is unreliable based on whether the criteria is met.

6. The method of claim 1, further comprising:
periodically calculating position fixes regardless of whether a request for a position fix is received from an application or a user; and
updating the previously-calculated position fix based on each new periodically-calculated position fix.

7. The method of claim 1, wherein the query is received from a user input device of a mobile computing device.

8. A mobile computing device, comprising:
a user interface configured to receive a query for a point of interest;
a location determination circuit configured to provide location data for the mobile computing device;
a memory configured to store a first location data including a previously-calculated position fix; and
a processing circuit configured to determine that the location determination circuit is unable to calculate new location data and to respond to the query based on the first location data, the response including displaying one or more points of interest and an indication that the previously-calculated position fix was used to process the query, the displayed one or more points of interest are selectable to launch a navigation application configured to provide directions from the previously-calculated position fix to a selected point of interest; the processing circuit is configured to determine whether the first location data meets a plurality of criteria, wherein the response to the query comprises an indication that the previously-calculated position fix is unreliable when the criteria are not met; the plurality of criteria includes at least one of:
a predetermined speed parameter at which the mobile computing device was traveling when the first location data was calculated;
whether the mobile computing device is in a different time zone from a time zone the mobile computing device was in when the first location data was calculated;
whether a general location of the mobile computing device is much different than a location for the first location data; and
whether a location uncertainty factor for the first location data is above a predetermined threshold.

9. The mobile computing device of claim 8, wherein the mobile computing device comprises a smartphone.

10. The mobile computing device of claim 8, wherein the location determination circuit is configured to periodically calculate the location data regardless of whether a request for a location data is received from an application operable on the processing circuit, wherein the processing circuit is configured to update the first location data with the new periodically-calculated location data.

11. A mobile computing device for responding to a location-based query, comprising:
means for receiving a location-based query for a point of interest;
means for determining that the mobile computing device is unable to determine a current position fix;
means for retrieving from memory a previously-calculated position fix calculated before receipt of the location-based query;
means for determining whether the previously-calculated position fix meets a plurality of criteria;
means for processing the location-based query based upon the previously-calculated position fix; and
means for providing a response to the query based on the previously-calculated position fix and whether the criteria are met, the response including displaying one or more points of interest and an indication that the previously-calculated position fix was used to process the location-based query, the displayed one or more points of interest are selectable to launch a navigation application configured to provide directions from the previously-calculated position fix to a selected point of interest.

12. The mobile computing device of claim 11, wherein the means for determining that the mobile device is unable to determine a current position fix comprise means for determining that insufficient satellite data is available.

13. The mobile computing device of claim 11, further comprising:
means for periodically calculating position fixes regardless of whether a request for a position fix is received from an application or a user; and
means for updating the previously-calculated position fix based on each new periodically-calculated position fix.

14. The mobile computing device of claim 11, wherein mobile computing device comprises a smartphone.

15. The method of claim 11, wherein the criteria comprises a predetermined speed parameter at which the mobile computing device was traveling when the previously-calculated position fix was calculated.

16. The method of claim 15, wherein the criteria further comprises whether the mobile computing device is in a different time zone from a time zone the mobile computing device was in when the previously-calculated position fix was calculated.

17. The method of claim 16, wherein the criteria further comprises whether a general location of the mobile computing device is much different than the previously-calculated position fix.

18. The method of claim 17, wherein the criteria further comprises whether a location uncertainty factor for the previously-calculated position fix is above a predetermined threshold.

* * * * *